United States Patent
Bombacino et al.

(10) Patent No.: US 9,971,406 B2
(45) Date of Patent: May 15, 2018

(54) VISUALLY ENHANCED TACTILE FEEDBACK

(71) Applicant: International Business Machines Corporation, Armonk, NY (US)

(72) Inventors: Vinicio Bombacino, Rome (IT); Nicola Milanese, Rome (IT); Riccardo Pizzutilo, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 14/561,490

(22) Filed: Dec. 5, 2014

(65) Prior Publication Data
US 2016/0162023 A1 Jun. 9, 2016

(51) Int. Cl.
*G06F 3/0482* (2013.01)
*G06F 3/01* (2006.01)
(Continued)

(52) U.S. Cl.
CPC .............. *G06F 3/016* (2013.01); *G06F 3/048* (2013.01); *G06F 3/0482* (2013.01);
(Continued)

(58) Field of Classification Search
CPC ............................ G06F 3/04842; G06F 3/0482
(Continued)

(56) References Cited

U.S. PATENT DOCUMENTS 5,510,808 A * 4/1996 Cina, Jr. ............. G06F 3/04855
345/684
6,724,931 B1 * 4/2004 Hsu ...................... G06K 9/6253
382/113
(Continued)

FOREIGN PATENT DOCUMENTS

WO 2010009552 A1 1/2010
WO 2012006431 A3 1/2012

OTHER PUBLICATIONS free-power-point-templates.com, "How to convert PPTX to EXE using Vaysoft", available at <http://www.free-power-point-templates.com/articles/how-to-pptx-to-exe/>, archive on May 30, 2013 at wayback machine <http://web.archived.org>, 2 pages.*
(Continued)

*Primary Examiner* — Reza Nabi
*Assistant Examiner* — Daniel Rodriguez
(74) *Attorney, Agent, or Firm* — Christopher McLane; Daniel R. Simek

(57) ABSTRACT

In an approach for visually enhancing tactile metadata, a computer receives an image on a first computing device. The computer selects an object from one or more objects depicted within the received image. The computer determines boundaries of the selected object. The computer assigns an object tag to the selected object within the determined boundaries, wherein the assigned object tag includes one or more keywords and terms describing the selected object. The computer assigns tactile metadata to the selected object within the determined boundaries based on
(Continued)

one or more physical properties associated with the assigned object tag. The computer creates a visually enhanced image based on the assigned tactile metadata, wherein the assigned tactile metadata includes one or more physical properties associated with the assigned object tag capable of being represented visually.

13 Claims, 5 Drawing Sheets

(51) Int. Cl.
    *G06F 3/0488*     (2013.01)
    *G06F 3/048*     (2013.01)
    *G06F 17/30*     (2006.01)
    *G06T 5/00*     (2006.01)
    *G09B 21/00*     (2006.01)
    *G06K 9/00*     (2006.01)

(52) U.S. Cl.
    CPC ...... *G06F 3/0488* (2013.01); *G06F 17/30268* (2013.01); *G06K 9/00* (2013.01); *G06T 5/00* (2013.01); *G09B 21/005* (2013.01)

(58) Field of Classification Search
    USPC ......................................................... 715/702
    See application file for complete search history.

(56) References Cited

U.S. PATENT DOCUMENTS

| | | | | |
|---|---|---|---|---|
| 7,239,992 B2* | 7/2007 | Ayache | ................. | G06T 13/20 434/262 |
| 7,296,217 B1* | 11/2007 | Earnshaw | ............. | G06Q 10/10 705/317 |
| 7,973,778 B2* | 7/2011 | Chen | ................. | G06F 3/0412 178/18.03 |
| 8,072,432 B2 | 12/2011 | Agevik et al. | | |
| 8,276,091 B2* | 9/2012 | Altkorn | ................. | G06F 3/048 345/621 |
| 8,344,862 B1* | 1/2013 | Donham | ............. | H04M 1/72547 340/407.1 |
| 8,566,329 B1* | 10/2013 | Freed | ................. | G06F 17/3053 707/748 |
| 8,762,840 B1* | 6/2014 | Gouglev | ............. | G06F 3/04883 345/173 |
| 9,122,645 B1* | 9/2015 | Amidon | ................. | G06Q 50/01 |
| 9,400,600 B2* | 7/2016 | Lee | ................. | G06F 3/0488 |
| 9,818,224 B1* | 11/2017 | Worley | ................. | G06T 19/006 |
| 2006/0150104 A1* | 7/2006 | Lira | ................. | G06F 3/048 715/733 |
| 2007/0005713 A1* | 1/2007 | LeVasseur | ............. | G06Q 10/107 709/206 |
| 2008/0052750 A1* | 2/2008 | Grunnet-Jepsen | . | H04N 7/17318 725/109 |
| 2008/0056564 A1* | 3/2008 | Lindbloom | ............. | G06K 9/4652 382/162 |
| 2008/0201734 A1* | 8/2008 | Lyon | ................. | G06Q 30/0251 725/34 |
| 2008/0244460 A1* | 10/2008 | Louch | ................. | G06F 3/04812 715/711 |
| 2008/0303784 A1* | 12/2008 | Yamaguchi | ............. | G06F 3/016 345/156 |
| 2009/0129650 A1* | 5/2009 | Hawkes | ................. | G06T 7/344 382/131 |
| 2009/0251421 A1 | 10/2009 | Bloebaum | | |
| 2009/0303175 A1* | 12/2009 | Koivunen | ............. | A63F 13/10 345/156 |
| 2009/0303199 A1* | 12/2009 | Cho | ................. | G06F 3/04845 345/173 |
| 2010/0004033 A1* | 1/2010 | Choe | ................. | G06F 1/1626 455/567 |
| 2010/0005393 A1* | 1/2010 | Tokashiki | ......... | G06F 17/30041 715/716 |
| 2010/0013761 A1* | 1/2010 | Birnbaum | ............. | G06F 1/1613 345/156 |
| 2010/0231541 A1* | 9/2010 | Cruz-Hernandez | ..... | G06F 3/016 345/173 |
| 2011/0144524 A1* | 6/2011 | Fish | ................. | A61B 18/1492 600/547 |
| 2011/0221759 A1* | 9/2011 | Motomura | ............. | G06T 15/04 345/582 |
| 2011/0225066 A1* | 9/2011 | Carter | ................. | G06F 17/3002 705/27.1 |
| 2011/0248941 A1* | 10/2011 | Abdo | ................. | G06F 3/0488 345/173 |
| 2012/0120109 A1* | 5/2012 | Lee | ................. | G06F 3/0483 345/647 |
| 2012/0147034 A1* | 6/2012 | Binzinger | ............. | G06F 3/0488 345/629 |
| 2012/0206390 A1* | 8/2012 | Ueno | ................. | G06F 3/016 345/173 |
| 2012/0268412 A1* | 10/2012 | Cruz-Hernandez | ... | G06F 3/0488 345/174 |
| 2013/0101217 A1* | 4/2013 | Lee | ................. | G06F 17/30699 382/190 |
| 2013/0120290 A1* | 5/2013 | Yumiki | ................. | G06F 3/041 345/173 |
| 2013/0127874 A1* | 5/2013 | Peterson | ................. | G06T 13/80 345/473 |
| 2013/0136363 A1* | 5/2013 | Na | ................. | G06F 17/30047 382/190 |
| 2013/0171685 A1* | 7/2013 | Schutze | ............. | G01N 15/1468 435/34 |
| 2013/0227450 A1* | 8/2013 | Na | ................. | G06F 3/048 715/764 |
| 2013/0262588 A1* | 10/2013 | Barak | ................. | H04L 67/22 709/204 |
| 2013/0278536 A1* | 10/2013 | Nakamura | ............. | G06F 3/016 345/173 |
| 2013/0307786 A1* | 11/2013 | Heubel | ................. | G06F 3/016 345/173 |
| 2013/0311881 A1* | 11/2013 | Birnbaum | ............. | G06F 3/0485 715/702 |
| 2013/0328762 A1* | 12/2013 | McCulloch | .......... | G02B 27/017 345/156 |
| 2013/0346899 A1* | 12/2013 | Cole | ................. | G06F 3/0482 715/771 |
| 2014/0013273 A1* | 1/2014 | Ng | ............. | G06T 5/50 715/802 |
| 2014/0015773 A1* | 1/2014 | Loeffler | ................. | G06F 3/016 345/173 |
| 2014/0040059 A1* | 2/2014 | Barabas | ................. | G06Q 30/0601 705/26.1 |
| 2014/0049483 A1* | 2/2014 | Kim | ................. | G06F 3/0488 345/173 |
| 2014/0049491 A1* | 2/2014 | Nagar | ................. | G06F 3/016 345/173 |
| 2014/0062927 A1* | 3/2014 | Hirose | ................. | G06F 3/016 345/173 |
| 2014/0139450 A1* | 5/2014 | Levesque | ................. | G08B 6/00 345/173 |
| 2014/0168111 A1 | 6/2014 | Mohammed et al. | | |
| 2014/0198068 A1* | 7/2014 | Lee | ................. | G06F 3/04886 345/173 |
| 2014/0208272 A1* | 7/2014 | Vats | ................. | G06F 3/011 715/852 |
| 2014/0253687 A1* | 9/2014 | Lee | ................. | G06F 3/0488 348/46 |
| 2014/0267065 A1* | 9/2014 | Levesque | ................. | G06F 3/016 345/173 |
| 2014/0267426 A1* | 9/2014 | Cook | ................. | G06T 11/60 345/642 |
| 2014/0294043 A1* | 10/2014 | Samarao | ................. | G01J 5/045 374/124 |
| 2015/0024841 A1* | 1/2015 | Montenegro | ....... | G07F 17/3209 463/31 |

(56) References Cited

U.S. PATENT DOCUMENTS

| | | | | |
|---|---|---|---|---|
| 2015/0097786 A1* | 4/2015 | Behles | ............... | G06F 3/041 |
| | | | | 345/173 |
| 2015/0127316 A1* | 5/2015 | Avisar | ............... | G06T 13/20 |
| | | | | 703/11 |
| 2015/0199024 A1* | 7/2015 | Birnbaum | ............... | G06F 3/017 |
| | | | | 715/702 |
| 2015/0227210 A1* | 8/2015 | Chen | ............... | G06F 3/016 |
| | | | | 345/156 |
| 2015/0253850 A1* | 9/2015 | Behles | ............... | G06F 3/0488 |
| | | | | 715/702 |
| 2015/0293592 A1* | 10/2015 | Cheong | ............... | G06F 3/016 |
| | | | | 345/173 |
| 2015/0339898 A1* | 11/2015 | Saboune | ............... | G08B 6/00 |
| | | | | 340/407.1 |
| 2016/0048311 A1* | 2/2016 | Purvis | ............... | G06F 3/0482 |
| | | | | 715/746 |
| 2016/0139671 A1* | 5/2016 | Jun | ............... | G06F 3/016 |
| | | | | 715/702 |
| 2016/0147333 A1* | 5/2016 | Levesque | ............... | G06F 3/0487 |
| | | | | 345/161 |
| 2016/0189397 A1* | 6/2016 | Mullins | ............... | G06T 7/408 |
| | | | | 345/633 |
| 2016/0189427 A1* | 6/2016 | Wu | ............... | G06T 19/006 |
| | | | | 345/633 |
| 2016/0328985 A1* | 11/2016 | Endo | ............... | G06F 3/0488 |
| 2016/0342213 A1* | 11/2016 | Endo | ............... | G06F 3/0488 |
| 2016/0342269 A1* | 11/2016 | Endo | ............... | G06F 3/0488 |
| 2016/0343173 A1* | 11/2016 | Mullins | ............... | G06F 3/011 |
| 2017/0011210 A1* | 1/2017 | Cheong | ............... | H04W 12/06 |
| 2017/0094636 A1* | 3/2017 | Fadell | ............... | H04W 68/005 |
| 2017/0097682 A1* | 4/2017 | Endo | ............... | G06F 3/016 |
| 2017/0103581 A1* | 4/2017 | Mullins | ............... | G06T 19/006 |

OTHER PUBLICATIONS

"IBM—Smarter Planet—The IBM 5 in 5—Italia", <http://www.ibm.com/smarterplanet/it/it/ibm_predictions_for_future/ideas/index.html>.

"Exchangeable image file format", From Wikipedia, the free encyclopedia, last modified on Sep. 21, 2014, <http://en.wikipedia.org/wiki/Exchangeable_image_file_format>.

List of IBM Patents or Patent Applications Treated as Related, Appendix P, Filed Herewith.

Vinicio Bombacino, et al., "Visually Enhanced Tactile Feedback", US Patent Application No. ?????  filed ????, Docket No. DE920140138US2 (a copy is not provided as this application is available to the Examiner).

* cited by examiner

VISUALLY ENHANCED TACTILE FEEDBACK

BACKGROUND OF THE INVENTION

The present invention relates generally to the field of tactile feedback technology, and more particularly to creating a visual representation of tactile feedback.

Haptic technology, or haptics, is a tactile feedback technology that recreates the sense of touch by applying forces, vibrations, or motions to a user through actuators (e.g., motors responsible for movement) incorporated in a computing device. Haptics manipulate the actuator using defined waveforms to produce a range of effects which may be perceived uniquely by an individual touching the computing device. Initially, haptics were only capable of providing strong feedback with a limited range of sensations to an entire device or providing limited localization of haptic feedback to a specific position (e.g., display instead of the body of the device) with an expanded effects, such as frequency range, response time, and intensity. As the technology continues to evolve, haptics currently incorporated in computing devices now provide the means to deliver both touch-coordinate specific responses and customizable haptic effects (e.g., virtual keyboard scrolling list) to the user.

When sensing physical interaction between a user and a computing device is necessary, haptic computing devices incorporate tactile sensors that measure information arising from a physical interaction with the environment. One of the most common implementations of tactile sensors are touchscreen devices, such as those utilized in mobile devices and computing. The touchscreen device allows a user to interact directly with what is displayed (e.g., images, icons, virtual keyboards, applications, etc.) by touching the screen with a specialized stylus and/or one or more fingers rather than utilizing an intermediate device, such as a computer mouse or a touchpad. The mechanical stimulation provided by the haptic feedback may then be utilized to assist in the creation of virtual objects in a computer simulation (e.g., developed model representing characteristics, behaviors, and functions of a physical or abstract system over time). The continued exchanges between the user and computer simulation via the touchscreen may then provide additional feedback (e.g., changes and updates to images, text responses, change in displayed information, etc.), which allows for confirmation of actions taken by a user and for additional interactions to occur based on received responses.

Digital images created and displayed by a computing device include metadata. Metadata provides information regarding the data content of the actual digital image. For example, digital images may include metadata that describes how large the picture is, the color depth, the image resolution, when the image was created, and other relevant data. In addition to the aforementioned metadata, additional metadata (e.g., GPS coordinates, compression ratios, software, etc.) and object tags (e.g., non-hierarchical keyword or term assigned to a digital image describing an item) may be changed and assigned to the digital image by a user and through image processing software which includes incorporating tactile effects. For example, a user or image processing software may identify objects and the boundaries associated with the object within a digital image. Once the boundaries of an object are defined, additional tactile effects may then be added to the metadata (e.g., tactile metadata), enhancing the viewing experience of future users.

SUMMARY

Aspects of the present invention disclose a method, computer program product, and system for visually enhancing tactile metadata. The method includes one or more computer processors receiving an image on a first computing device. The method further includes one or more computer processors selecting an object from one or more objects depicted within the received image. The method further includes one or more computer processors determining boundaries of the selected object. The method further includes one or more computer processors assigning an object tag to the selected object within the determined boundaries, wherein the assigned object tag includes one or more keywords and terms describing the selected object. The method further includes one or more computer processors assigning tactile metadata to the selected object within the determined boundaries based on one or more physical properties associated with the assigned object tag. The method further includes one or more computer processors creating a visually enhanced image based on the assigned tactile metadata, wherein the assigned tactile metadata includes one or more physical properties associated with the assigned object tag capable of being represented visually.

DETAILED DESCRIPTION

Online and mobile commerce has been increasing especially due to the adoption of mobile devices, such as smartphones and tablet computers and the increasing availability of wireless network communications (e.g., wireless technology enabling the exchange of data over the Internet). By utilizing a mobile device, a consumer is able to research, examine, compare, and purchase products at the convenience of the user whenever an Internet connection is available. However, typically a consumer is only able to view an image of the product and read the related product description and consumer reviews. In some instances when haptic feedback is incorporated, a consumer may be able to receive limited tactile feedback through applied forces, vibrations, and motions providing an indication of a characteristic of the product, such as texture, but the perception of temperature and elasticity is limited to an actual physical interaction between a consumer and the product.

Embodiments of the present invention recognize that the perception of temperature and elasticity (e.g., the ability of a material to resume its natural shape after being stretched or compressed) are difficult to emulate as tactile feedback and do not translate effectively from a viewable image over the Internet. Additional embodiments of the present invention provide a means to visually enhance an image with tactile feedback to provide a user with visual cues related to the type of tactile feedback that would be encountered. Additionally, embodiments of the present invention recognize the processing capabilities to perform and view the enhancements may not be present on all computing devices. Embodiments of the present invention create an installable application for the computing device of a designated recipient after a separate computing device processes a received image with enhanced tactile feedback metadata.

Figure 1:
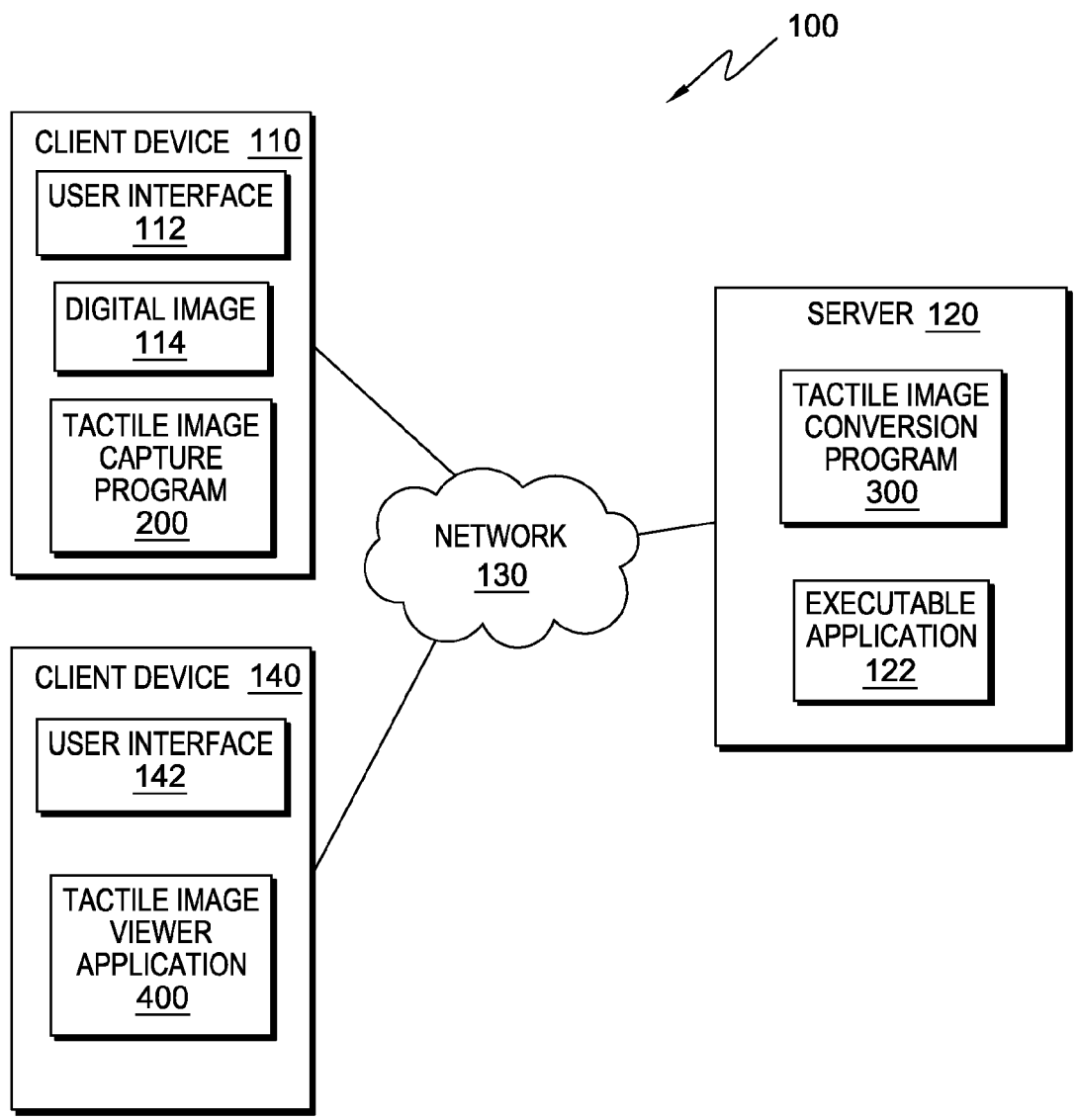
FIG. 1 is a functional block diagram illustrating a mobile computing environment, in accordance with an embodiment of the present invention.

The present invention will now be described in detail with reference to the Figures. FIG. 1 is a functional block diagram illustrating a mobile computing environment, generally designated 100, in accordance with one embodiment of the present invention. FIG. 1 provides only an illustration of one embodiment and does not imply any limitations with regard to the environments in which different embodiments may be implemented.

In the depicted embodiment, mobile computing environment 100 includes client device 110, client device 140, and server 120 interconnected over network 130. Mobile computing environment 100 may include additional computing devices, mobile computing devices, servers, computers, storage devices, or other devices not shown.

Client device 110 and client device 140 may be an electronic device or computing system capable of executing machine readable program instructions and receiving and sending data. In various embodiments, client device 110 and client device 140 may be a laptop computer, a tablet computer, a netbook computer, a personal computer (PC), a desktop computer, a personal digital assistant (PDA), a smart phone, or any programmable electronic device capable of communicating with another computing device via network 130. In other embodiments, client device 110 and client device 140 may represent a computing system utilizing multiple computers and components acting collectively to perform a task when accessed through network 130, as is common in data centers and with cloud computing applications. Client device 110 includes user interface 112, digital image 114, and tactile image capture program 200. Client device 140 includes user interface 142 and tactile image viewer application 400. In one embodiment, client device 110 and client device 140 are interchangeable and are capable of performing identical operations. In the depicted embodiment however, client device 110 is designated as the device capturing digital image 114, and client device 140 is designated as receiving an enhanced version of digital image 114 for viewing.

User interface 112 is a program that provides an interface between a user of client device 110 and a plurality of applications including tactile image capture program 200, which resides on client device 110 and/or may be accessed over network 130. User interface 142 is a program that provides an interface between a user of client device 140 and a plurality of applications including tactile image viewer application 400, which resides on client device 140 and/or may be accessed over network 130. User interface 112 and user interface 142 are capable of sending and receiving information between client device 110 and client device 140 and sending and receiving information to tactile image conversion program 300. A user of client device 110 can utilize user interface 112 to perform actions related to obtaining digital image 114, enhancing metadata for digital image 114 utilizing tactile image capture program 200, and sending digital image 114 to client device 140 or to tactile image conversion program 300. User interface 112 may also display digital image 114 and receive information from tactile image capture program 200. A user of client device 140 can utilize user interface 142 to perform actions related to information received from tactile image conversion program 300 and to interact and view digital image 114 through tactile image viewer application 400.

A user interface, such as user interface 112 and user interface 142, refers to the information (e.g., graphic, text, sound) that a program presents to a user and the control sequences the user employs to control and interact with the program. A variety of types of user interfaces exist. In one embodiment, user interface 112 and user interface 142 are graphical user interfaces. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. The actions in GUIs are often performed through direct manipulation of the graphical elements.

Digital image 114 is a static digital image depiction or recording of a visual perception of a physical item (e.g., photograph) that is captured by an optical device (e.g., cameras, digital cameras, scanners, computer graphics). A digital image is a numeric representation of a two-dimensional image (e.g., raster image, bitmap image) containing a finite set of digital values (e.g., pixels) stored as rows and columns with brightness and color. In one embodiment, digital image 114 may be created by utilizing a digital camera and photo capture software incorporated as part of client device 110. In another embodiment, digital image 114 may be a scanned digital image stored on client device 110. In some other embodiment, digital image 114 is received through an application (e.g., e-mail client, downloaded webpage image, attachment, etc.) installed on client device 110, and is then stored on client device 110. In the depicted embodiment, digital image 114 resides on client device 110. In another embodiment, digital image 114 may reside on client device 140, server 120, or on another client device, server, or storage device (not shown) provided digital image 114 is accessible to tactile image capture program 200.

Server 120 may be any electronic device or computing system capable of processing program instructions and receiving and sending data. In some embodiments, server 120 may be a laptop computer, a tablet computer, a netbook computer, a PC, a desktop computer, a PDA, a smart phone, or any programmable device capable of communication with client device 110 and client device 140 over network 130. In other embodiments, server 120 may represent a server computing system utilizing multiple computers as a server system, such as in a cloud computing environment. Server 120 includes tactile image conversion program 300 and executable application 122.

Executable application 122 may be a file or program, which when initiated on a computing device results in the execution of indicated tasks according to encoded instructions resulting in the installation of tactile image viewer application 400 on a client device (e.g., client device 140). Executable application 122 is created by tactile image conversion program 300 upon receipt of an enhanced version of digital image 114 from tactile image capture program 200. In the depicted embodiment, executable application 122 resides on server 120. In other embodiments, executable application 122 may reside on another server or client device provided executable application 122 can be sent to client device 140.

Network 130 may be a local area network (LAN), a wide area network (WAN) such as the Internet, a wireless local area network (WLAN), any combination thereof, or any combination of connections and protocols that will support communications between client device 110, client device 140, server 120, other computing devices, and servers (not shown), in accordance with embodiments of the inventions. Network 130 may include wired, wireless, or fiber optic connections.

Tactile image capture program 200 is a software program for assigning additional metadata to digital image 114 (e.g., for later use by tactile image conversion program 300). Tactile image capture program 200 assigns tactile metadata to assist in the creation of an enhanced version of digital image 114, which is capable of providing an animated interactive visual representation of tactile feedback when digital image 114 is later viewed. Tactile image capture program 200 transmits an enhanced version of digital image 114 (e.g., digital image 114 with assigned metadata) to tactile image conversion program 300. In the depicted embodiment, tactile image capture program 200 resides on client device 110. In other embodiments, tactile image capture program 200 may reside on other devices, such as client device 140 or server 120, provided that tactile image capture program 200 is accessible to user interface 112 and has access to digital image 114 and tactile image conversion program 300. Tactile image capture program 200 is described in more detail in FIG. 2.

Tactile image conversion program 300 is a software program capable of providing additional enhancements to received digital image 114 and processing the tactile metadata assigned within digital image 114 to create executable application 122. Tactile image conversion program 300 receives an enhanced version of digital image 114 with tactile metadata from tactile image capture program 200. After processing, tactile image conversion program 300 sends an executable application to client device 140 for installation. In the depicted embodiment, tactile image conversion program 300 resides on server 120. In other embodiments, tactile image conversion program 300 may reside on other devices, such as another client device or server (not shown), provided that tactile image conversion program 300 is accessible to tactile image capture program 200 and has access to client device 140. Tactile image conversion program 300 is described in more detail in FIG. 3.

Tactile image viewer application 400 is a software program resulting from the installation of executable application 122 that is created by tactile image conversion program 300 for digital image 114. Tactile image viewer application 400 is capable of displaying digital image 114 with enhanced visual tactile effects and interpreting actions received through user interface 142 to display an interactive animated version of digital image 114. In the depicted embodiment, tactile image viewer application 400 resides on client device 140. In other embodiments, tactile image viewer application 400 may reside on other devices, such as client device 110, server 120, or on other client devices and servers not shown, provided that tactile image viewer application 400 is accessible to user interface 142. Tactile image viewer application 400 is described in more detail in FIG. 4.

Figure 2:
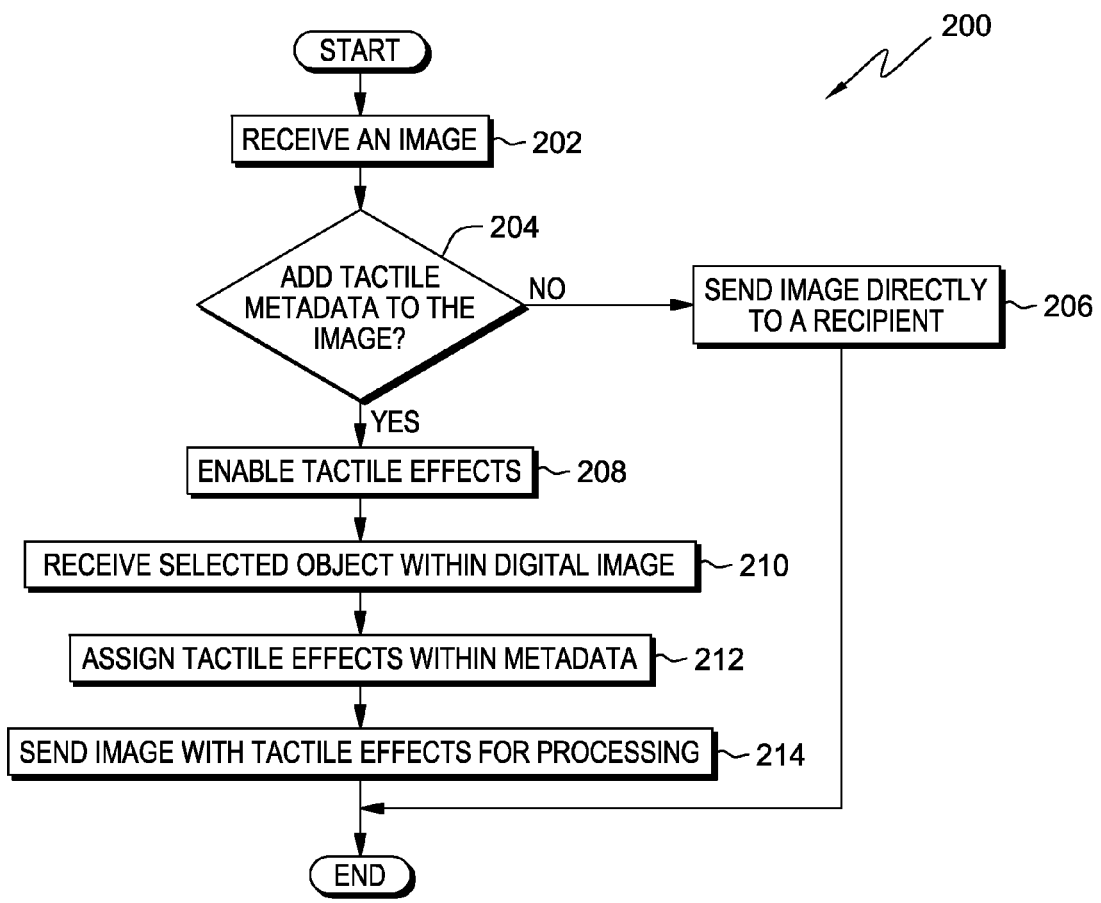
FIG. 2 is a flowchart depicting operational steps of a tactile image capture program on a client device within the mobile computing environment of FIG. 1 for assigning additional visual enhancements to tactile metadata, in accordance with an embodiment of the present invention.

FIG. 2 is a flowchart depicting operational steps of tactile image capture program 200, a program for assigning additional visual enhancements to tactile metadata, in accordance with an embodiment of the present invention (e.g., allows tactile metadata to be viewed through a visual representation. Tactile image capture program 200 may be initiated and terminated at the discretion of the user of client device 110 in addition to the depicted embodiment.

In step 202, tactile image capture program 200 receives digital image 114. In some embodiments, tactile image capture program 200 receives digital image 114 as a result of digital image 114 being created by a camera incorporated within client device 110 (e.g., built-in digital camera with image capture software). In another embodiment, tactile image capture program 200 receives digital image 114 as a stored file, which is selected from the memory of client device 110 (e.g., digital image 114 is stored in memory and may be selected for future editing). In some other embodiment, tactile image capture program 200 receives digital image 114 as a downloaded file from another program and/or application installed on client device 110 or over network 130 (e.g., from the Internet or server 120). For example, digital image 114 may be sent to an e-mail client as an attachment from another user, which may be saved and/or accessed for viewing and editing. Once digital image 114 is received and opened, tactile image capture program 200 displays digital image 114 on client device 110.

In decision 204, tactile image capture program 200 determines whether tactile effects are to be added to digital image 114. In one embodiment, tactile image capture program 200 may provide a message inquiring whether tactile effects are to be added to digital image 114. Tactile image capture program 200 may provide a message when digital image 114 is active (e.g., at the time receipt, opened for viewing, prior to sending, etc.). For example, upon taking a picture resulting in digital image 114 (or viewing a previously captured image of digital image 114), tactile image capture program 200 may display a message such as "Add tactile effects to digital image 114?" with "yes" and "no" selections on user interface 112. Tactile image capture program 200 may then receive a selection via user interface 112 of one of the two selections. In another embodiment, tactile image capture program 200 may provide suggestions of tactile effects to add (e.g., edit metadata, add object tags, etc.) which may or may not be selected via user interface 112. In some other embodiment, tactile image capture program 200 may receive a selection to send the existing version of digital image 114 to a recipient (e.g., text message attachment, e-mail, etc.) indicating tactile effects are not to be added.

If tactile image capture program 200 determines tactile effects are to be added to digital image 114 (decision 204, yes branch), then tactile image capture program 200 enables tactile effects (step 208). Conversely, tactile image capture program 200 may determine tactile effects are not to be added to digital image 114 (decision 204, no branch) and then tactile image capture program 200 may send digital image 114 directly to a recipient (step 206).

In step 206, tactile image capture program 200 sends digital image 114 directly to a recipient. When digital image 114 is not enhanced with additional tactile effects within the corresponding metadata, additional processing to enable digital image 114 to be viewed on an alternate client device, such as client device 140, is not necessary. In one embodiment, tactile image capture program 200 may receive an indication to store digital image 114 (e.g., digital image 114 may be stored on client device 110 and/or an alternate device, such as server 120.) When tactile image capture program 200 stores digital image 114, tactile effects may be added at a later time or sent to a recipient. In another embodiment, tactile image capture program 200 receives a selection to send digital image 114 to a recipient through an application (e.g., e-mail, text messaging, file transfer, etc.). Tactile image capture program 200 sends digital image 114 from client device 110 to another client device (e.g., client device 140) without modifications to digital image 114. Digital image 114 includes the original metadata provided when digital image 114 was initially created which is viewable by another client device without additional processing.

In step 208, tactile image capture program 200 enables tactile effects. Tactile image capture program 200 displays digital image 114 with image editing functions (e.g., toolbar with functions to edit metadata, add object tags, edit digital image 114, etc.). Once the tactile image capture program 200 enables tactile effects, tactile image capture program 200 is capable of receiving selections from within digital image 114. Additionally, tactile image capture program 200 is capable of receiving a selection from enabled tactile effects and image editing functions. Tactile image capture program 200 does not proceed until selections are made to edit digital image 114. However, a user of client device 110 may close tactile image capture program 200 at the discretion of the user prior to or after adding tactile effects to digital image 114.

In step 210, tactile image capture program 200 receives a selected object within digital image 114. In one embodiment, tactile image capture program 200 receives a selection of an object within digital image 114 through user interactions with user interface 112. For example, a user may tap an object (e.g., utilizing a stylus or finger) within digital image 114, thus selecting the object. In another example, an object may be selected utilizing a selection tool, drawing a box around an object (e.g., standard size box may be dragged over an object and/or resized to fit and select the object). In another embodiment, tactile image capture program 200 may utilize image processing by applying stored shapes to identify objects within digital image 114. After tactile image capture program 200 identifies objects, tactile image capture program 200 may display identified objects to a user, which the user may then select one or more of the displayed objects. For example, digital image 114 may be a group of people. Tactile image capture program 200 applies stored object patterns to digital image 114, which identifies the faces of individuals in the group of people. Tactile image capture program 200 would then highlight the faces (e.g., place a box around the faces) and wait for a selection of an identified face to add additional effects. Tactile image capture program 200 determines the area associated with the selected object within digital image 114 (e.g., the boundaries of the object and pixels comprising the object are identified and stored).

In step 212, tactile image capture program 200 assigns tactile effects within the metadata. As tactile image capture program 200 determines the boundaries and pixels associated with an object (step 210), tactile image capture program 200 is now capable of assigning object tags and tactile metadata to the identified object. Tactile image capture program 200 receives an object tag assignment for the identified object. Tactile image capture program 200 includes a repository of available object tags (e.g., keywords or terms describing an item that are assigned to a piece of information) to be selected from for assignment to the identified object. In one embodiment, tactile image capture program 200 assigns an object tag to an object based on a user selection from the available list of object tags. For example, a user may select the object tag after scrolling though the list of object tags, accept the object tag as provided through an auto-fill feature in response to typing, and accept a recommended object tag based on the shape of the object. In another embodiment, tactile image capture program 200 may automatically assign an object tag from the list of available object tags based upon image processing (e.g., determines the type of object through the applied shaped utilized to determine objects.). Once tactile image capture program 200 assigns the object tag to the object, the following tactile metadata may be assigned to the object to enhance digital image 114 in any order.

Tactile image capture program 200 provides a list of materials to further define the tagged object. In one embodiment, tactile image capture program 200 may provide a reduced list of materials based upon the assigned object tag. Tactile image capture program 200 may then receive a user selection from the reduced list and assign the material. For example, an object tag of "pillow" was assigned. Tactile image capture program 200 may provide a tailored list including materials of "feather," "memory foam," "cotton," and "buckwheat." In another embodiment tactile image capture program 200 may automatically assign a material. For example, an object tag of "tree" is assigned. The only material in the list of materials associated with "tree" is "wood;" therefore, tactile image capture program 200 assigns "wood" as the material for the object. In another embodiment, tactile image capture program 200 displays the entire list of materials. Tactile image capture program 200 may receive a material selection from a user from the available materials and assigns the material to the object (may also be used to change an automatic assignment).

Tactile image capture program 200 may also receive tactile metadata in regards to the object defining the elasticity of an object. Elasticity refers to the ability of an object or material to resume the original shape after being stretched or compressed (e.g., softness and memory, with softness being the property of transforming a material due to applied pressure, and memory being the capacity of the material to resume a previous shape after deformation). For example, when an individual holds a stress ball and applies pressure, the stress ball deforms, taking on the shape of the space available within the hand of the individual. When released, the stress ball resumes the original shape over time, dependent on the type of material the stress ball is made of. In one embodiment, tactile image capture program 200 may assign a known level of elasticity to an object based upon the properties associated with the object tag and assigned material. In another embodiment, tactile image capture program 200 may receive a specified distinct value regarding the elasticity of an object based on the values available. For example, with a mattress, a range of values may be available noting the stiffness of the springs. An individual may prefer a firm mattress and thus selects a specific value at the high end of the range. In some other embodiment, tactile image capture program 200 may assign a range of values to an object.

Tactile image capture program 200 may also receive tactile metadata regarding the perceived temperature of an object. In one embodiment, tactile image capture program 200 may receive a single value noting the temperature associated with an object. For example, the temperature of a chair is dependent upon the temperature of the air in a room (e.g., is not capable of generating heat or cooling effects). The temperature of the chair may then be set at a uniform seventy degrees Fahrenheit. In another embodiment, tactile image capture program 200 may receive a range of values specifying a lower to higher temperature scale. For example, the flame of a candle varies in temperature with the red outer portion of the flame generally being the coolest and the inner blue portion of the flame being the hottest. Once tactile image capture program 200 receives temperature information, tactile image capture program 200 assigns the tactile metadata for the object within digital image 114.

In step 214, tactile image capture program 200 sends digital image 114 with the tactile effects for processing. In response to assigning tactile metadata to objects within digital image 114 (step 212), tactile image capture program 200 sets a flag within the metadata of digital image 114, thus changing the protocol associated with sending digital image 114 to a recipient (e.g., client device 140). The additional tactile metadata incorporated in digital image 114 may not be viewable by client device 140 without additional processing. For example, if tactile image capture program 200 sends digital image 114 directly to client device 140 without processing, an error may result when client device 140 initiates actions to view digital image 114 as the information and/or file format may not be recognized. Tactile image capture program 200 receives a selection to send digital image 114 to a recipient (e.g., user of client device 140). As digital image 114 includes the updated flag noting a change in protocol, tactile image capture program 200 sends digital image 114 to tactile image conversion program 300. In addition, tactile image capture program 200 includes the information associated with the designated recipient to be utilized after processing is performed by tactile image conversion program 300.

Figure 3:
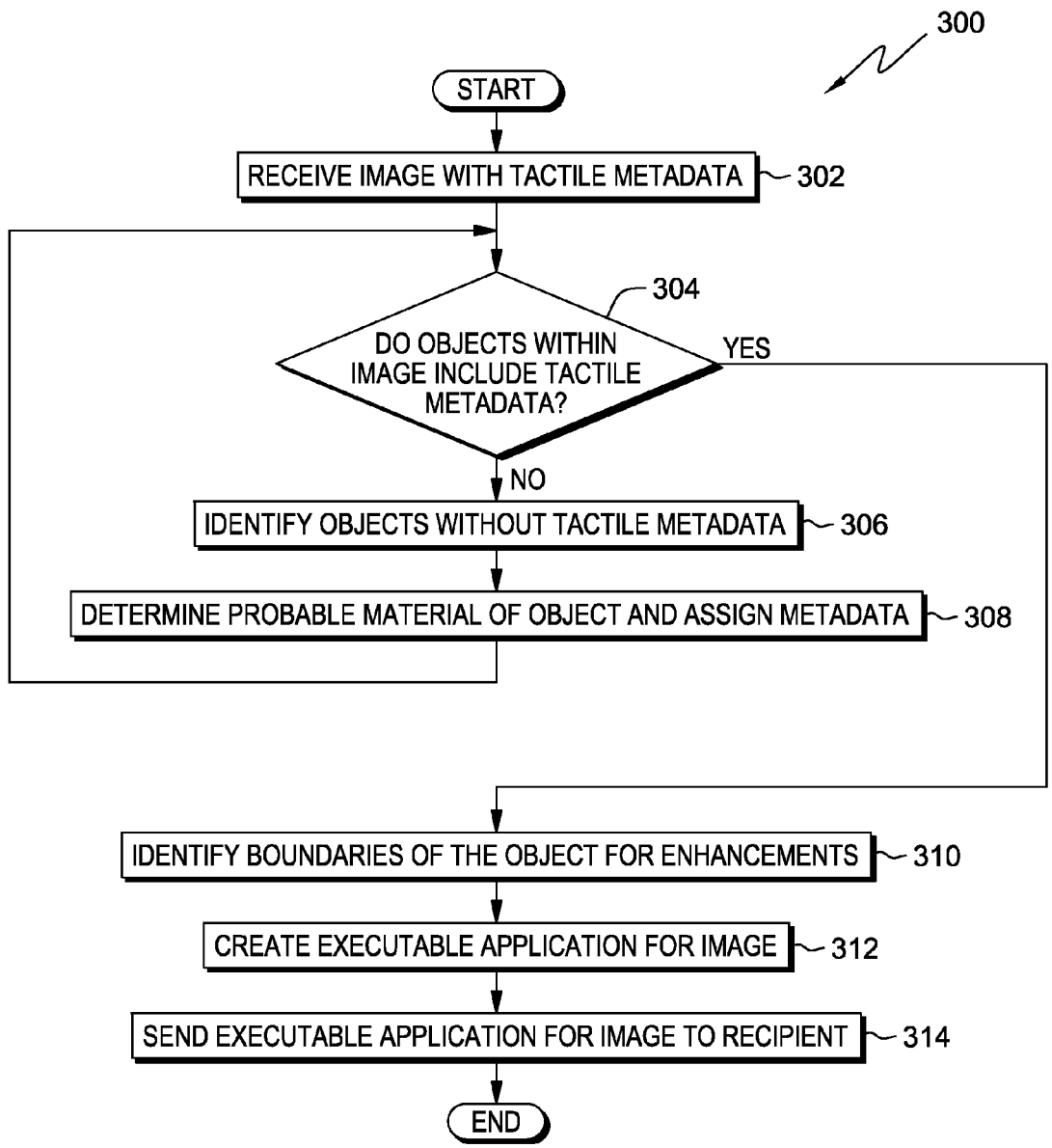
FIG. 3 illustrates operational steps of a tactile image conversion program on a server within the mobile computing environment of FIG. 1 for creating an executable application with visually enhanced tactile metadata, in accordance with an embodiment of the present invention.

FIG. 3 illustrates operational steps of a tactile image conversion program 300, a program for creating an executable application with visually enhanced tactile metadata, in accordance with an embodiment of the present invention.

In step 302, tactile image conversion program 300 receives digital image 114 with tactile metadata from tactile image capture program 200 over network 130. In addition to digital image 114, tactile image conversion program 300 receives recipient information (e.g., e-mail address, cell phone number) to complete the initiated send request of digital image 114. Upon receipt of digital image 114 from tactile image capture program 200, tactile image conversion program 300 initiates.

In step 304, tactile image conversion program 300 determines whether objects within digital image 114 include tactile metadata. Tactile image conversion program 300 processes the enhanced version of digital image 114 and extracts the objects with associated tactile metadata. Tactile image conversion program 300 creates a table with the information based on the extracted information (e.g., objects and tactile metadata for material, elasticity, and temperature). Tactile image conversion program 300 then determines whether objects are included within the table that do not include information in one or more of the associated tactile metadata categories (e.g., tactile metadata for a material, elasticity, and temperature, etc.).

If tactile image conversion program 300 determines identified objects within digital image 114 include tactile metadata (decision 304, yes branch), then tactile image conversion program 300 identifies the boundaries for the visual enhancements. If tactile image conversion program 300 determines identified objects within digital image 114 do not include tactile metadata (decision 304, no branch), then tactile image conversion program 300 determines objects without tactile metadata (step 306).

In step 306, tactile image conversion program 300 identifies objects without tactile metadata. Tactile image conversion program 300 identifies entries within the table that correspond to objects that do not include tactile metadata (e.g., object may be one or more of available types of tactile metadata).

In step 308, tactile image conversion program 300 determines the probable material of the object and assigns the tactile metadata. In one embodiment, tactile image conversion program 300 determines the probable material by associating the object tag with the provided list of materials, such as when a single material is associated with the object tag. In another embodiment, tactile image conversion program 300 may determine a probable material by analyzing the resolution of the object to establish the type of material, such as when a material is not associated with an object tag. In some other embodiment, tactile image conversion program 300 may utilize the image resolutions to determine a material when more than one material is listed with an object tag. In yet some other embodiment, tactile image conversion program 300 may determine the probable material based on similar and related object tags. For example, two identified objects are assigned an object tag of "car." Only one of the two object tags for "car" in the table includes tactile metadata for material, elasticity, and temperature. Tactile image conversion program 300 identifies that the entries within the table for the two object tags are assigned the same value of "car." Therefore, tactile image conversion program 300 assigns the missing tactile metadata information for the second instance of the object tag of "car" to the same values in the table associated with the first object tag of "car." Once tactile image conversion program 300 determines a probable material for the object, tactile image conversion program 300 assigns the tactile metadata to the object within digital image 114 and the associated extracted table.

At the completion of step 308, tactile image conversion program 300 returns to step 304 to determine whether additional objects within digital image 114 do not include tactile metadata. Tactile image conversion program 300 repeats steps 304 through 308 until the identified objects in digital image 114 include tactile metadata.

In step 310, tactile image conversion program 300 identifies the boundaries of the objects within the table for visual enhancements. Tactile image conversion program 300 utilizes the coordinates of the pixels to identify the boundaries of the object. Tactile image conversion program 300 may use mathematical equations and algorithms based upon the shape and the initial provided boundaries defining the shape of the object from the table to assign tactile metadata to the interior pixels within the objects of digital image 114. In one embodiment, tactile image conversion program 300 assigns a single value to the determined pixels of an identified object (e.g., tactile effect values are constant). For example, when a temperature is set to a constant value, the pixels within the object may be set to a constant value. In another embodiment, tactile image conversion program 300 may perform additional calculations to determine different values based on a range of values (e.g., range of values for temperature and/or elasticity). Tactile image conversion program 300 then assigns the varying levels to the pixels within the boundaries of the identified object based on starting and end points. For example, a picture of flowing lava would transition in both temperature and elasticity as the lava (e.g., higher temperature, greater elasticity) transforms to rock substance (e.g., lower temperature, decreased elasticity).

In step 312, tactile image conversion program 300 creates executable application 122 for digital image 114. Tactile image conversion program 300 utilizes the original tactile metadata and additional information (e.g., object tags, tactile metadata) stored within digital image 114 and creates executable application 122, which may be installed on client device 140 to view the enhanced version of digital image 114. Tactile image conversion program 300 includes the program instructions necessary to execute the installation of executable application 122 (e.g., created tactile image viewer application 400) and the program instructions for tactile image viewer application 400. Tactile image conversion program 300 displays the initial viewable image (e.g., background) to the enhanced version of digital image 114. Tactile image conversion program 300 stores the identified objects and tactile metadata assignments within executable application 122. Tactile image conversion program 300, through the created code for executable application 122, enables enhanced visual effects to accompany the tactile metadata included in the enhanced version of digital image 114.

In step 314, tactile image conversion program 300 sends executable application 122 to the recipient. Tactile image conversion program 300 utilizes the information received in regards to the recipient from tactile image capture program 200 (step 302). Tactile image conversion program 300 then completes the initial send request (e.g., e-mail, text message, file transfer) and sends executable application 122 to client device 140.

Figure 4:
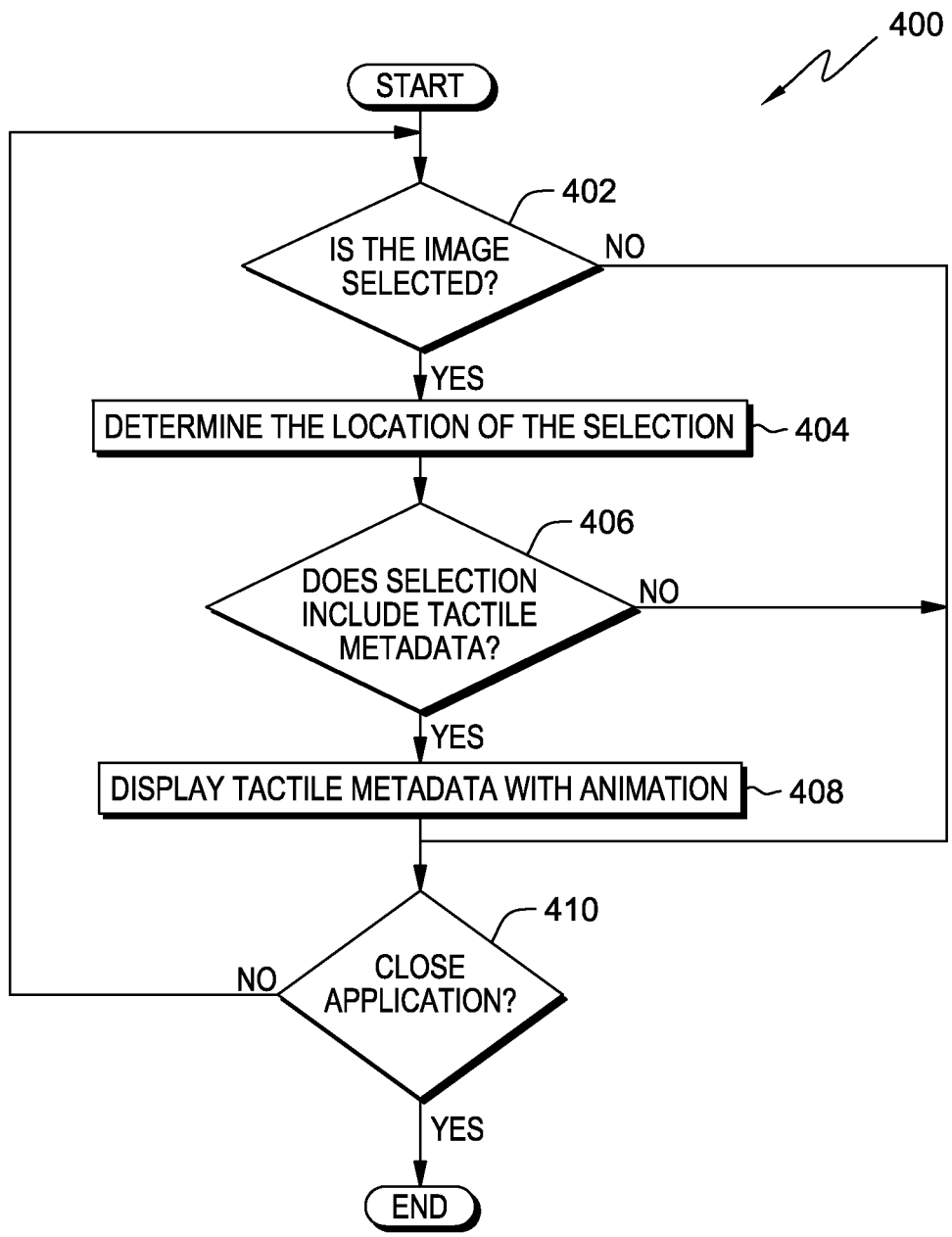
FIG. 4 illustrates operational steps of a tactile image viewer application on a client device within the mobile computing environment of FIG. 1 for installing an executable application allowing the viewing of an image including visually enhanced tactile metadata, in accordance with an embodiment of the present invention.

FIG. 4 illustrates operational steps of a tactile image viewer application 400, a program for installing an executable application, allowing the viewing of an image including visually enhanced tactile metadata, in accordance with an embodiment of the present invention.

Initially client device 140 receives executable application 122 from tactile image conversion program 300 (step 314). Upon receipt of executable application 122, a user of client device 140 though user interface 142 selects and allows the installation of executable application 122. At the completion of the installation of executable application 122, tactile image viewer application 400 is installed and opened on client device 140. Tactile image viewer application 400 initiates with the enhanced version of digital image 114 set as the background (e.g., initially shown as an image without additional visual enhancement effects visible).

In step 402, tactile image viewer application 400 determines whether digital image 114 is selected. Tactile image viewer application 400 determines whether a user of client device 140 initiates a physical interaction with digital image 114 though user interface 142. For example, when utilizing a touchscreen device with a finger or stylus, the user is capable of "touching" the displayed visual image. The tactile sensors and associated software within client device 140 recognize the physical interaction between the user of client device 140 and digital image 114 as a selection. Tactile image viewer application 400 receives the information conveyed by the tactile sensors and determines digital image 114 is selected. Conversely, the tactile sensors may not register a physical interaction between the user of client device 140 via user interface 142 and digital image 114. Tactile image viewer application 400, therefore, does not receive information from the tactile sensors and determines digital image 114 is not selected.

If tactile image viewer application 400 determines digital image 114 is selected, (decision 402, yes branch), then tactile image viewer application 400 determines the location of the selection (step 404). If tactile image viewer application 400 determines digital image 114 is not selected (decision 402, no branch), then tactile image viewer application 400 determines whether a selection has been made to close tactile image viewer application 400 (decision 410).

In step 404, tactile image viewer application 400 determines the location of the selection. Tactile image viewer application 400 retrieves the coordinates of the interaction with user interface 142 (e.g., the coordinates for point of the physical interaction with the stylus and the touchscreen). Tactile image viewer application 400 applies the retrieved coordinates to the stored information regarding digital image 114. In an example embodiment, the retrieved coordinates from user interface 142 directly correspond to pixel coordinates within digital image 114, and tactile image viewer application 400 is, therefore, able to determine the location of the selection within digital image 114.

In decision 406, tactile image viewer application 400 determines whether the selection includes tactile metadata. In one embodiment, tactile image viewer application 400 utilizes the coordinates retrieved from the physical interaction and searches a table of object tags and tactile metadata for matching coordinates (e.g., the table created in step 304 of tactile image conversion program 300). In another embodiment, tactile image viewer application 400 may compare the coordinates retrieved from the physical interaction with the layout file (e.g., defines the visual structure) associated with the enhanced version of digital image 114. Tactile image viewer application 400 may determine a complete and/or partial match between the retrieved coordinates and the coordinates within the table and determine tactile metadata corresponding to the selection (e.g., touch coordinated may be included within a larger set of coordinates, coordinates may be on the edge of an object). Alternatively, tactile image viewer application 400 may determine that none of the retrieved coordinates are found in the table and determines tactile metadata is not included for the selection. For example, digital image 114 includes a single-object tag identified as a rubber ball, which includes tactile metadata. The area surrounding the rubber ball does not have any tactile metadata associated with the coordinates (e.g., rubber ball is surrounded by air). When the physical interaction is identified as touching the rubber ball, tactile image viewer application 400 determines the selection includes tactile metadata. Alternatively, when the physical interaction is associated with coordinates outside of the coordinates for the rubber ball, tactile image viewer application program 400 determines the selection does not include tactile metadata.

If tactile image viewer application 400 determines the selection includes tactile metadata (decision 406, yes branch), then tactile image viewer application 400 displays the tactile metadata with animation effects. If tactile image viewer application 400 determines the selection does not include tactile effects (decision 406, no branch), then tactile image viewer application 400 determines whether a selection has been made to close tactile image viewer application 400 (decision 410).

In step 408, tactile image viewer application 400 displays the tactile metadata with animation. When tactile image viewer application 400 determines retrieved coordinates from the physical interaction match coordinates within the stored table, tactile image viewer application 400 displays a visual enhancement of the tactile metadata from the table that corresponds to the matching coordinates. At the point of contact (e.g., physical interaction), tactile image viewer application 400 may display a shape around the point of contact (e.g., transparent halo shape, circle, highlight, etc.). Tactile image viewer application 400 determines the size of the shape based on the calculated area constituting the physical interaction between the user of user interface 142 and the object in digital image 114 (e.g., the area of the object may be larger than the area touched but only the touched area is highlighted). Tactile image viewer application 400 may also display the shape with a calculated shadow gradient (e.g., additional shading around the shape similar to a perceived shadow). Tactile image viewer application 400 utilizes the coordinates associated with the initial point of contact to begin the enhanced visualization of the tactile effects. In one embodiment, the shape may remain at a fixed point within digital image 114. In another embodiment, tactile image viewer application 400 may identify motion from the initial point of contact in any direction through user interface 142. When motion is detected, tactile image viewer application 400 follows the traced trajectory provided by the motion received through user interface 142 (e.g., continuous movement from one point to another). Tactile image viewer application 400 then incorporates the tactile metadata with enhanced visual effects starting at the point of contact based on the type of tactile metadata and the corresponding values associated with the identified object.

For tactile metadata associated with temperature, tactile image viewer application 400 may utilize an animation that changes the color of the shape surrounding the point of contact (e.g., fingertip) utilizing a color coding convention. For example, the color red is typically associated with hot temperatures, and the color blue is typically associated with cold temperatures. The remaining colors of the spectrum between red and blue decrease in perceived temperature from hottest to coldest. Tactile image viewer application 400 may vary the intensity of the color of the shape displayed depending upon the value of the temperature assigned in the tactile metadata to the point of contact. For example, a dark bright blue would indicate a very cold temperature whereas a light blue may only indicate cool temperatures. In another embodiment, tactile image viewer application 400, in addition to the color, may display a message (e.g., text, "!," fire symbol, etc.) indicating the temperature is above or below what may be safely handled. For example, a picture of liquid nitrogen would show a dark bright blue but actual contact with liquid nitrogen could result in freezing the flesh of an individual; therefore, tactile image viewer application 400 can display a warning indicating the extreme temperature. Tactile image viewer application 400 may also vary the displayed temperature when following a trajectory across an image based on a range of values set in the tactile metadata. For example, a thermal image of the human body may be incorporated into the tactile metadata of an image of a person. The core of the body near the heart is depicted as red (e.g., hot) which is the initial point of contact. As a finger traces a trajectory across the image between the heart and fingertips, the color of the shape following the path of the trajectory eventually changes to a yellow at the shoulder, followed by green through the upper arm, and finally transitions to a blue color when the hand and fingers are reached.

For tactile metadata associated with elasticity (e.g., softness and memory), tactile image viewer application 400 may incorporate animation effects into digital image 114 based upon the point of contact. At the point of contact, based upon the level of elasticity assigned to the object, tactile image viewer application 400 alters the digital image to deform to the set level of elasticity (e.g., softer objects such as rubber would be perceived to deform more than a hard object, such as wood, which may not deform in a perceivable manner). For example, at the point of contact, tactile image viewer application 400 alters digital image 114 to provide the visual perception of a stylus sinking into the image. Tactile image viewer application 400 may also vary the speed at which digital image 114 resumes its shape based upon the level of elasticity assigned in the tactile metadata. For example, a rubber ball may resume the original shape almost immediately whereas a stress ball may resume the original shape over a longer period of time due to the differences in elasticity. Tactile image viewer application 400 may apply additional animation techniques when a trajectory is traced across user interface 142. Depending on the elasticity of the object, tactile image viewer application 400 modifies digital image 114 based on the trajectory and the tactile metadata to create animation effect (e.g., appearance of movement within the viewed image). For example, the object in digital image 114 is a memory foam pillow. At the initial point of contact, a finger is perceived as sinking into the pillow creating a deep depression. As the finger is moved across the pillow, the initial finger depression remains, and the depression is viewed as moving from the initial point of contact across the pillow following the trajectory. When viewing the initial point of contact over time, the material would slowly fill back in and resume the initial shape before the initial point of contact was made.

In decision 410 tactile image viewer application 400 determines whether a selection has been made to close tactile image viewer application 400. Tactile image viewer application 400 may receive a selection to close tactile image viewer application 400 (e.g., selection of a "x," select "exit" from a drop down menu, select "close application"). If tactile image viewer application 400 receives a selection to close (decision 410, yes branch), then tactile image viewer application 400 completes. Once tactile image viewer application 400 is completed, a user through user interface 142 may select to uninstall tactile image viewer application 400. If tactile image viewer application 400 determines a selection was not made to close (decision 410, no branch), then tactile image viewer application 400 determines whether digital image 114 is selected (step 402). Tactile image viewer application 400 continues to display enhanced visual effects for tactile metadata within digital image 114 until tactile image viewer application 400 is closed.

Figure 5:
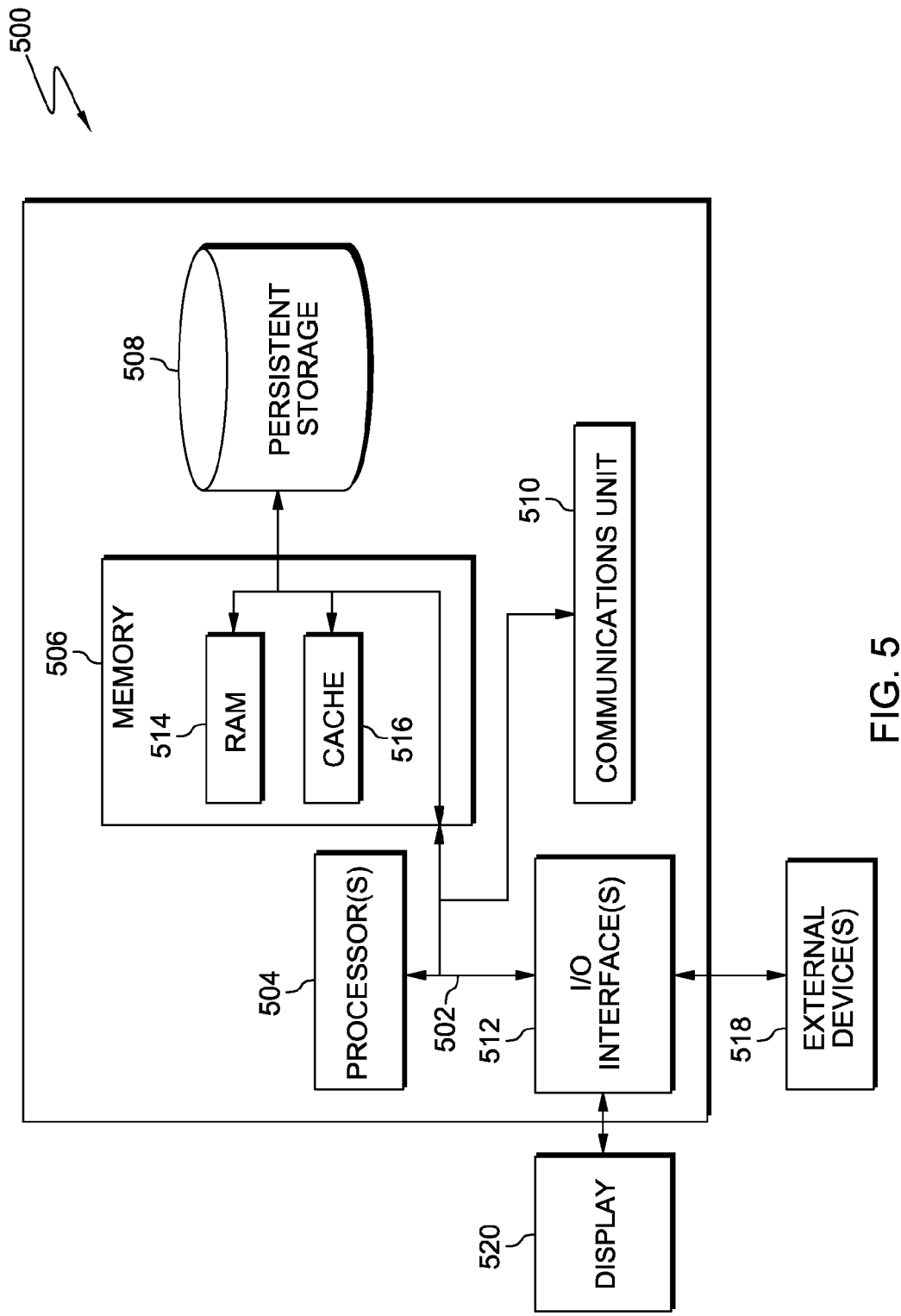
FIG. 5 is a block diagram of components of the proxy server computer executing the tactile image conversion program, in accordance with an embodiment of the present invention.

FIG. 5 depicts a block diagram of components of mobile computing environment 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Mobile computing environment includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

User interface 112, digital image 114, tactile image capture program 200, executable application 122, tactile image conversion program 300, user interface 142, and tactile image viewer application 400 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of enterprise grid and client devices. In these examples, communications unit 510 includes one or more network interface cards. Communications unit 510 may provide communications through the use of either or both physical and wireless communications links. User interface 112, digital image 114, tactile image capture program 200, executable application 122, tactile image conversion program 300, user interface 142, and tactile image viewer application 400 may be downloaded to persistent storage 508 through communications unit 510.

I/O interface(s) 512 allows for input and output of data with other devices that may be connected to mobile computing environment. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., user interface 112, digital image 114, tactile image capture program 200, executable application 122, tactile image conversion program 300, user interface 142, and tactile image viewer application 400 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for visually enhancing tactile metadata, the computer program product comprising: one or more computer readable storage media and program instructions stored on the one or more computer readable storage media, the program instructions comprising:

program instructions to receive an image on a first computing device;

program instructions to select an object from one or more objects depicted within the received image;

program instructions to determine boundaries of the selected object;

program instructions to determine a type of object associated with the selected object;

program instructions to assign an object tag to the selected object within the determined boundaries based on the determined type of object, wherein the assigned object tag includes one or more keywords and terms describing the selected object;

program instructions to assign tactile metadata to the selected object within the determined boundaries based on one or more physical properties associated with the assigned object tag;

program instructions to create a visually enhanced image based on the assigned tactile metadata, wherein the assigned tactile metadata includes the one or more physical properties associated with the assigned object tag capable of being represented visually, wherein the visually enhanced image is in a three dimensional plane, wherein the visually enhanced image includes a deformation that is a softness property that transforms a material due to an applied pressure, wherein a resumption includes a memory property that allows the material to resume a previous shape after the deformation in the three dimensional plane;

create an executable application based on the created visually enhanced image, wherein the created executable application includes an image viewing application capable of displaying tactile metadata in response to user interaction with the created visually enhanced image;

program instructions to receive the created visually enhanced image;

program instructions to extract one or more objects within the received visually enhanced image with the assigned tactile metadata;

program instructions to create a table based on the extracted one or more objects within the received visually enhanced image with the assigned tactile metadata;

program instructions to determine whether an object within the extracted one or more objects does not include assigned tactile metadata for a type of material;

responsive to determining that the object within the extracted one or more objects does not include assigned tactile metadata for a type of material, program instruction to identify an entry within the created table that corresponds to the object within the extracted one or more objects that does not include assigned tactile metadata for each physical property;

program instructions to determine one or more types of materials of the object based on the assigned object tag and a list of materials;

program instructions to analyze a resolution of the object;
program instructions to determine a type of material of the object from within the determined one or more types of materials based on the analyzed resolution of the object;

program instructions to assign the determined material to the object within the received created visually enhanced image and to an entry within the associated created table associated with the object;

program instructions to identify boundaries for each of the one or more objects within the created table for visual enhancements; and program instructions to assign tactile metadata to interior pixels associated with the identified boundaries for each of the one or more objects within the created table for visual enhancements.

2. The computer program product of claim 1, wherein determining the boundaries of the selected object further comprises one or more of the following program instructions, stored on the one or more computer readable storage media, to:

receive coordinates identifying the boundaries of the selected object; and utilize image processing techniques to determine the boundaries of the selected object.

3. The computer program product of claim 1, wherein assigning tactile metadata to the selected object within the determined boundaries based on one or more physical properties associated with the assigned object tag further comprises program instructions, stored on the one or more computer readable storage media, to:

receive a selection of one or more physical properties associated with the assigned object tag, wherein the received selection of one or more physical properties includes one or more of the following: a type of material and an elasticity; and assign the received selection of one or more physical properties associated with the assigned object tag to the selected object within the determined boundaries.

4. The computer program product of claim 1 further comprising program instructions, stored on the one or more computer readable storage media, to:

install the created executable application on a second computing device;

display the created visually enhanced image on the second computing device through the installed executable application;

determine whether a selection is made within the created visually enhanced image;

responsive to determining the selection is made within the created visually enhanced image, determine a first location associated with the selection;

determine whether the determined first location of the selection includes tactile metadata; and responsive to determining the first location of the selection includes the tactile metadata, display a shape around the determined first location based on one or more visual enhancements associated with the tactile metadata associated with the determined first location.

5. The computer program product of claim 4, wherein displaying the shape around the determined first location based on one or more visual enhancements comprises program instructions, stored on the one or more computer readable storage media, to:

display an elasticity associated with the determined first location as the deformation and resumption of the enhanced image over a time based on one or more elasticity values included in the tactile metadata associated with the determined first location.

6. The computer program product of claim 4 further comprising program instructions, stored on the one or more computer readable storage media, to:

determine whether the determined first location made within the created visually enhanced image includes a continuous movement from the determined first location to a second location;

responsive to determining the determined first location made within the created visually enhanced image includes a continuous movement from the determined first location to the second location, determine a trajectory corresponding to the continuous movement; and display an animation in the determined trajectory based on tactile metadata between the determined first location and the second location.

7. The computer program product of claim 1, wherein to assign the tactile metadata to the interior pixels associated with the identified boundaries for each of the one or more objects within the created table for visual enhancements further comprises program instructions, stored on the one or more computer readable storage media, to:

determine whether the object includes a range of values associated with the elasticity and the temperature;

responsive to determining that the object includes a range of values associated with the elasticity and the temperature, calculate a varying level of elasticity and temperature for the interior pixels within the identified boundaries; and assign the varying level of elasticity and temperature to the interior pixels based on a starting point and an ending point.

8. A computer system for visually enhancing tactile metadata, the computer system comprising:

one or more computer readable storage media and program instructions stored on the one or more computer readable storage media, the program instructions comprising:

program instructions to receive an image on a first computing device;

program instructions to select an object from one or more objects depicted within the received image;

program instructions to determine boundaries of the selected object;

program instructions to determine a type of object associated with the selected object;

program instructions to assign an object tag to the selected object within the determined boundaries based on the determined type of object, wherein the assigned object tag includes one or more keywords and terms describing the selected object;

program instructions to assign tactile metadata to the selected object within the determined boundaries based on one or more physical properties associated with the assigned object tag;

program instructions to create a visually enhanced image based on the assigned tactile metadata, wherein the assigned tactile metadata includes the one or more physical properties associated with the assigned object tag capable of being represented visually, wherein the visually enhanced image is in a three dimensional plane, wherein the visually enhanced image includes a deformation that is a softness property that transforms a material due to an applied pressure, wherein a resumption includes a memory property that allows the material to resume a previous shape after the deformation in the three dimensional plane;

program instructions to create an executable application based on the created visually enhanced image, wherein the created executable application includes an image viewing application capable of displaying tactile metadata is response to user interaction with the created visually enhanced image;
program instructions to receive the created visually enhanced image;
program instructions to extract one or more objects within the received visually enhanced image with the assigned tactile metadata;
program instructions to create a table based on the extracted one or more objects within the received visually enhanced image with the assigned tactile metadata;
program instructions to determine whether an object within the extracted one or more objects does not include assigned tactile metadata for a type of material;
responsive to determining that the object within the extracted one or more objects does not include assigned tactile metadata for a type of material, program instructions to identify an entry within the created table that corresponds to the object within the extracted one or more objects that does not include assigned tactile metadata for each physical property;
program instructions to determine one or more types of materials of the object based on the assigned object tag and a list of materials;
program instructions to analyze a resolution of the object;
program instructions to determine a type of material of the object from within the determined one or more types of materials based on the analyzed resolution of the object;
program instructions to assign the determined material to the object within the received created visually enhanced image and to an entry within the associated created table associated with the object;
program instructions to identify boundaries for each of the one or more objects within the created table for visual enhancements; and
program instructions to assign tactile metadata to interior pixels associated with the identified boundaries for each of the one or more objects within the created table for visual enhancements.

9. The computer system of claim 8, wherein assigning tactile metadata to the selected object within the determined boundaries based on one or more physical properties associated with the assigned object tag further comprises program instructions, stored on the one or more computer readable storage media, to:
receive a selection of one or more physical properties associated with the assigned object tag, wherein the received selection of one or more physical properties includes one or more of the following: a type of material and an elasticity; and
assign the received selection of one or more physical properties associated with the assigned object tag to the selected object within the determined boundaries.

10. The computer system of claim 8 further comprising program instructions, stored on the one or more computer readable storage media, to:

install the created executable application on a second computing device;
display the created visually enhanced image on the second computing device through the installed executable application;
determine whether a selection is made within the created visually enhanced image;
responsive to determining the selection is made within the created visually enhanced image, determine a first location associated with the selection;
determine whether the determined first location of the selection includes tactile metadata; and
responsive to determining the first location of the selection includes the tactile metadata, display a shape around the determined first location based on one or more visual enhancements associated with the tactile metadata associated with the determined first location.

11. The computer system of claim 10, wherein displaying the shape around the determined first location based on one or more visual enhancements program instructions, stored on the one or more computer readable storage media, to:
display an elasticity associated with the determined first location as the deformation and resumption of the enhanced image over a time based on one or more elasticity values included in the tactile metadata associated with the determined first location.

12. The computer system of claim 10 further comprising program instructions, stored on the one or more computer readable storage media, to:
determine whether the determined first location made within the created visually enhanced image includes a continuous movement from the determined first location to a second location;
responsive to determining the determined first location made within the created visually enhanced image includes a continuous movement from the determined first location to the second location, determine a trajectory corresponding to the continuous movement; and
display an animation in the determined trajectory based on tactile metadata between the determined first location and the second location.

13. The computer system of claim 8, wherein to assign the tactile metadata to the interior pixels associated with the identified boundaries for each of the one or more objects within the created table for visual enhancements further comprises program instructions, stored on the one or more computer readable storage media, to:
determine whether the object includes a range of values associated with the elasticity and the temperature;
responsive to determining that the object includes a range of values associated with the elasticity and the temperature, calculate a varying level of elasticity and temperature for the interior pixels within the identified boundaries; and
assign the varying level of elasticity and temperature to the interior pixels based on a starting point and an ending point.

* * * * *